Jan. 22, 1963 T. G. MARSHALL, JR 3,075,149

VOLTAGE AND FREQUENCY MEMORY SYSTEM

Filed May 3, 1961 2 Sheets-Sheet 1

INVENTOR.

THOMAS G. MARSHALL, JR.

BY Eugene M. Whitacre

ATTORNEY

INVENTOR.
THOMAS G. MARSHALL, JR.
BY Eugene M. Whitacre
ATTORNEY

United States Patent Office
3,075,149
Patented Jan. 22, 1963

3,075,149
VOLTAGE AND FREQUENCY MEMORY SYSTEM

Thomas G. Marshall, Jr., Skillman, N.J., assignor to Radio Corporation of America, a corporation of Delaware Filed May 3, 1961, Ser. No. 107,564
14 Claims. (Cl. 328—121)

The present invention relates to electrical memory circuits and more particularly to electrical circuits of systems of this type which are adapted to provide voltage and frequency memory.

It is an object of this invention to provide an improved electrical memory circuit for stabilized voltage and/or frequency memory operation over relatively-wide control voltage and frequency ranges.

Many voltage memory circuits or systems devised for use in control and computer systems have been comparatively complicated and costly, while lacking a desired degree of adaptability to different uses.

It is therefore a further object of this invention to provide an improved and economical electrical memory system with relatively few circuit components and simplified circuits, which is adapted for voltage and/or frequency memory in a variety of uses, and with simplified voltage control.

In accordance with the invention, in the memory circuit or system a monostable blocking oscillator is provided which is adjustable to different frequency levels in response to control voltage gating pulse or like information. Applied higher-frequency pulses synchronize the oscillator to one of a plurality of sub-harmonic or sub-multiple frequencies, each of which is constant in the absence of control information, so that the circuit or system acts as a frequency memory.

The memory circuit also provides voltage memory and is essentially of the two-terminal type in which the control voltage or information is applied or introduced at the same point or port as that from which the controlled output voltage or signal is derived. Because of the frequency-division operation, the controlled output voltage is quantized and is the nearest quantum level of larger magnitude than a corresponding applied control voltage.

The frequency of oscillation at the different subharmonics or submultiples of the synchronizing pulse frequency is determined by the amplitude of the applied control voltage, and is controllable over a wide range. When the control voltage is removed or cut off, the quantized output voltage, and the resultant operating frequency, remain constant so that the circuit has both voltage and frequency memory as referred to.

The invention will further be understood from the following description when considered with reference to the accompanying drawings, and its scope is pointed out in the appended claims.

Figure 4:
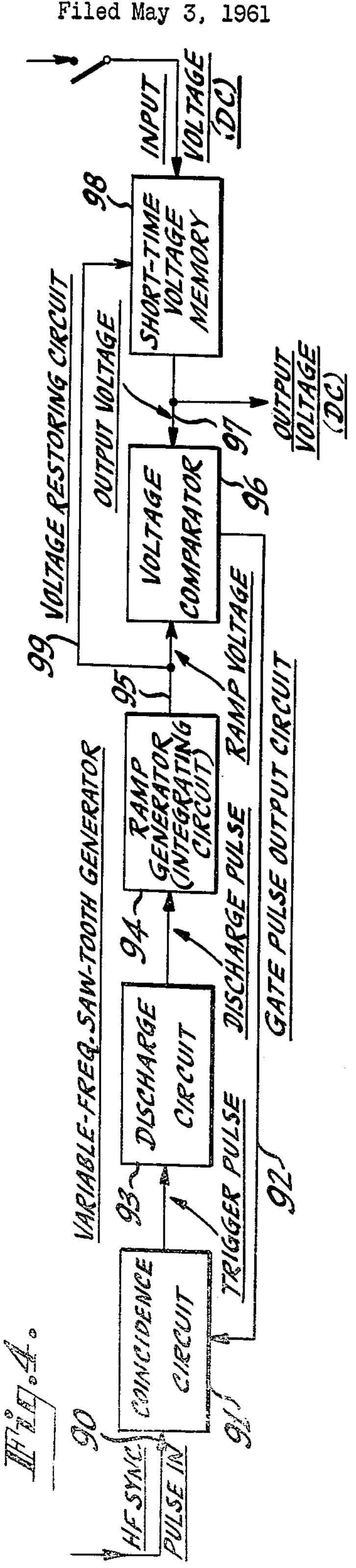
Figure 1:
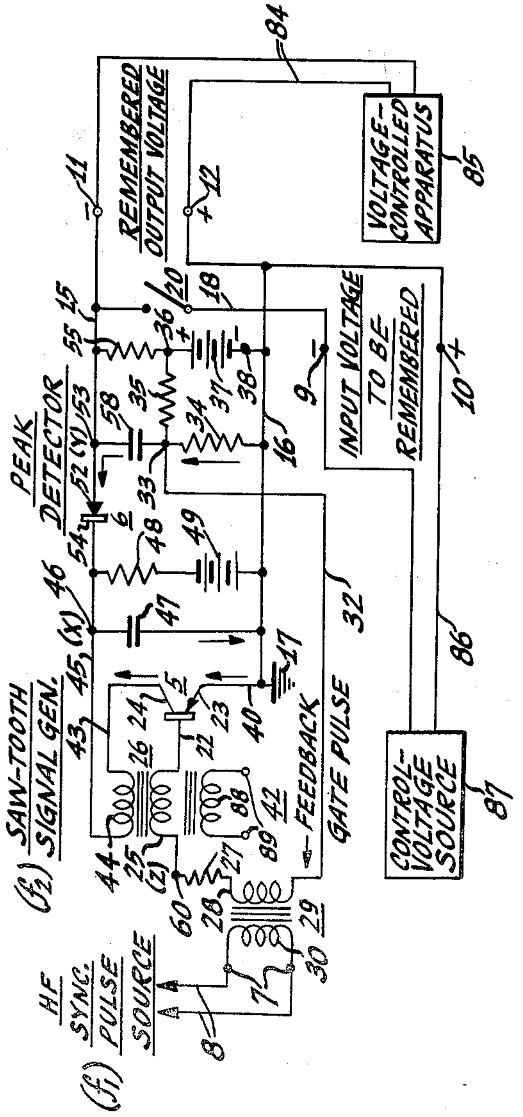
Figure 3:
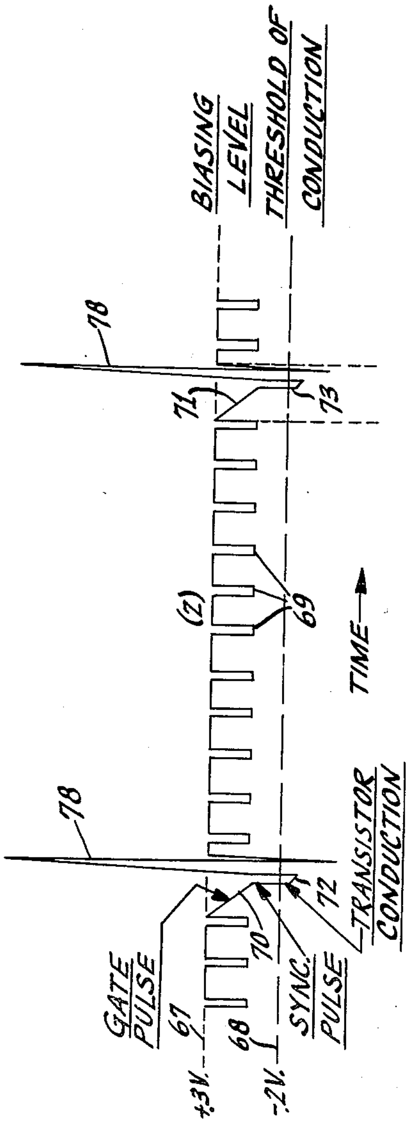
Figure 2:
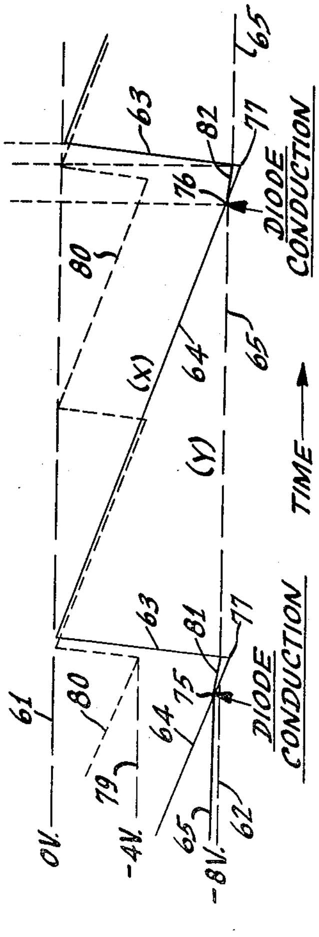

In the drawings, FIGURE 1 is a schematic circuit diagram of a voltage-controlled memory circuit or system embodying the invention;

FIGURES 2 and 3 are graphs showing signal waveforms illustrating certain operating conditions and features of the circuit of FIGURE 1, in accordance with the invention; and FIGURE 4 is a block schematic diagram representative of major circuit elements and their operational relation and features in the circuit of FIGURE 1.

Referring to the drawings and particularly to FIGURE 1, a simplified and economical memory circuit is provided through the use of a single transistor 5 as part of a saw-tooth generator indicated by the legend, and a single diode 6 in a diode peak detector, also as indicated by the legend. The saw-tooth signal generator includes a self-triggering monostable blocking oscillator whose frequency is controllable at submultiple or subharmonic frequencies of an applied synchronizing pulse signal which is of constant frequency. High-frequency synchronizing pulses from any suitable source (not shown) are applied to input terminals 7 through supply conductors 8.

The memory circuit has a pair of input terminals 9 and 10 for an input or control voltage, or a voltage to be remembered, as indicated by the legend, and a corresponding pair of output terminals 11 and 12 for the remembered output voltage, also as indicated by the legend. Both sets of terminals are connected to a common signal input-output circuit having an effectively high-potential or high-side conductor 15 and an effectively low-potential or low-side conductor 16. The latter conductor is connected to common ground means or chassis 17 for the circuit or system and represents the common circuit return means therefor. Thus the terminals 10 and 12 are the "low-potential" terminals and the terminals 9 and 11 are the "high-potential" terminals for the input and output voltages. The input voltage from the terminal 9 is applied to the common circuit lead 15 through an input connection lead 18 which includes activating or control switch means, either manual or electronic, represented by the switch 20. This is normally in the open position, as shown, to remove the input or control voltage and to apply it only during control periods, as will be described.

The transistor 5 may be of the three-element P-N-P type having a base 22, an emitter 23 and a collector 24, as indicated. The base circuit of the transistor includes, serially therein, a secondary winding 25 of a feedback coupling transformer 26, a base current control resistor 27, and the secondary winding 28 of a sync-pulse input transformer 29, the primary 30 of which is connected with the input terminals 7. The base or input circuit is completed back to the common ground lead 16 through a gate signal or pulse feedback circuit connection 32, a bias-voltage supply terminal 33, and a base resistor 34 which is a low-resistance section of a bias voltage divider. The resistor 34 is connected serially through a second resistor 35 of the voltage divider to a positive terminal 36 of a voltage source or battery 37. The negative terminal 38 of the source 37 is connected with the ground or common return lead 16 and thence to the opposite end of the voltage-divider or base resistor 34. The emitter 23 is connected to the ground lead 16 through a circuit lead 40, and thus to the base 22 through the base resistor 34 and base circuit elements above referred to.

As noted, the oscillator economically utilizes a single transistor element and is of the monostable blocking type whose frequency is controllable. Feedback by transformer coupling from the collector 24 to the base 22 provides the desired switching action by the transistor 5. Thus the collector is connected through collector circuit leads or conductors 43—45 with a feedback winding 44 on the transformer 26 to apply feedback energy to the base circuit by coupling through the secondary winding 26 therein. On the collector circuit conductor 45 is a first voltage point or terminal 46, as will hereinafter be referred to. Between the collector circuit, at the terminal 46, and the ground conductor 16 is connected an integrating capacitor 47 for the oscillator circuit. Also connected between the collector circuit conductor 45 and the ground conductor 16 is a series integrating or charging resistor 48 and a source of operating or biasing potential, such as battery 49, for the transistor and integrating circuit. The battery or potential source has a polarity relation to the circuit as indicated, whereby the voltage point or terminal 46 is normally negative with respect to the conductor 16. In this circuit, the battery or voltage source may have a potential of 90 volts, for example, the resistor 48 may have a resistance of 30K ohms, and the integrating capacitor 47 may have a capacity value of .25 microfarad. The base control resistor 27 may have a resistance of 4.1K ohms, these values being given only by way of example.

Referring now to the diode or peak detector portion of the circuit, the diode 6 has an anode 52 connected with the input-output voltage lead 15 and a second voltage point or terminal 53 thereon, and has a cathode 54 connected with the lead 45 and the other voltage terminal 46 thereon. The diode output load impedance means or resistor is indicated at 55, and is connected between the lead 15 and the terminal 36 and thence through the voltage divider resistors 35 and 34 to the ground lead 16. It is thus also connected to the positive side of the reverse-bias voltage source 37. Connected between the bias potential supply terminal 33 and the terminal 53 is a diode output smoothing capacitor 58 for the voltage memory means of the circuit as will be described.

This type of memory system is one in which the high-frequency $f_1$ pulses synchronize a lower-frequency $f_2$ oscillator to a subharmonic or submultiple of the frequency $f_1$. The frequency of the oscillator is controllable and is constant in the absence of control. The frequency of the oscillator adjusts itself to remain at one of several reference levels. These levels are the possible subharmonics or sub-multiples of the frequency $f_1$, that is, frequencies $f_1/2$, $f_1/3$, and so on. Adjustment to this level is accomplished by causing the oscillator to trigger or fire and start a new cycle only when a synchronizing pulse is present. Thus the oscillator will remain at one of the reference frequencies without drift. This type of oscillator differs from the usual type in that it has no preferred frequency of oscillation, that is, it will assume any frequency that a control signal indicates, but, when a frequency is once established, it continues oscillating at this frequency. The specific system for this type of operation will now be considered further.

In the circuit of FIGURE 1 it may be assumed, by way of example, that the diode load resistor 55 may have a resistance of 50K ohms, the voltage divider resistor sections 34 and 35 may have resistance values of 350 ohms and 100K ohms respectively, and the control capacitor 58 may have a capacity of 1.0 microfarad. The reverse-bias battery or voltage source 37 may have a voltage of 90 volts. The transistor 5 may be of the P-N-P type as noted, and may be a commercial type known as a 2N269, while the diode 6 may be of the type known commercially as a T9G transitron.

The applied input and the resultant output voltages may be considered in the present example to be direct-current in the range of 20 volts or less and generally within a range of 2 to 10 volts. The high-frequency signal pulse frequency is generally chosen to be substantially 20 times the lowest operating frequency of the oscillator in the signal generator, and in the present example it may be considered that the frequency $f_1$ for the applied synchronizing signals may be substantially 20 kc., while the frequency $f_2$ of the oscillator or signal generator may then be from 1 kc. to 5 kc.

It will be noted in FIGURE 1 that the voltage terminals 46 and 53 are likewise designated, as operating points on the system, by the letters $x$ and $y$ respectively. A third voltage point or terminal 60 in the system is likewise designated by the letter $z$. This last named terminal is located in the input or base circuit 42 of the oscillator between the limiting resistor 27 and the secondary 25 of the feedback transformer 26. These three terminals will be considered and referred to in the description of the operation which follows, and for this purpose reference is made to FIGURES 2 and 3, along with FIGURE 1.

In FIGURES 2 and 3 there are two sets of related wave forms, one being a saw-tooth wave form as shown in FIGURE 2 and the other being a pulse wave form as shown in FIGURE 3, and both having the same time scale. The saw-tooth wave form of FIGURE 2 is drawn between a zero voltage reference level indicated by a dash line 61 representing zero voltage level at the terminal 46 or $x$ in the circuit of FIGURE 1 and a certain input or control voltage level, negative with respect thereto, as indicated by the dotted line 62. In the saw-tooth wave, the steep front lines 63 represent the discharge rate, between these levels, of the integrating capacitor 47 through the transistor 5 when the latter fires or conducts. The connecting rear slope lines 64 represent the charging rate, between these levels, of the capacitor 47 from the integrating supply source 49 through the charging resistor 48. The dash lines 65 in FIGURE 2 represent the slight decay, towards zero volts, of the voltage level at 62, which may be considered, in the present example, to be 8 volts negative. The voltage to be remembered, for example 7.8 volts, may be considered to have been applied from the terminals 9—10 to the circuit, by closure of the switch means 20 momentarily. The output voltage at the terminals 11—12 may be 8.0 volts under these conditions. This is the quantized output voltage, resulting from the then established frequency of oscillation, which is the nearest quantum level of larger magnitude than the control or input voltage.

In FIGURE 3 the biasing level on the transistor 5, of +.3 volt, for example, as provided at the terminal 33 on the voltage divider 34—35, is indicated by the dotted line 67. This is shown with respect to a dash line 68, representing the threshold of conduction of the transistor, which may be considered to be −.2 volt in the present example. When the base voltage on the transistor 5 is brought below the threshold level, the transistor fires or conducts. Further in the description of the operation, reference will be made to the applied synchronizing pulses 69 in FIGURE 3, which are applied in the negative direction with respect to the biasing level 67, and to gating pulses 70 and 71 and two of the next successive sync pulses 72 and 73 which add to the respective negative gating pulses to fire the transistor 5 in synchronism with the sync signal.

Referring to FIGURES 1 and 2, the operation of this circuit is as follows: with the circuit energized and the switch means 20 open after a brief closing for the application of an input voltage, such as the −7.8 volts referred to, and with high-frequency $f_1$ synchronizing pulses being applied to the input terminals 7, these pulses at 20 kc., for example, plus a low-frequency $f_2$ gating pulse, at 20/12 or 1.66 kc., for example, derived from the diode detector circuit and introduced across the base resistor 34 of the transistor 5, cause the oscillator to trigger at the frequency $f_2$. This is a submultiple or subharmonic of the synchronizing pulse frequency so that the circuit acts as a frequency divider.

The oscillator, through the transistor 5, serves to discharge the integrating capacitor 47 each cycle, as indicated in FIGURE 2 by the discharge lines 63 of the saw-tooth graph. Following discharge, the voltage across the capacitor 47, at the point $x$ in FIGURE 1, changes negatively as indicated in FIGURE 2 by the voltage charge lines 64. When the voltage at $x$, or the terminal 46, reaches a level or value such as indicated at the point 75 and 76 in FIGURE 2, the diode 6 conducts because the terminal 53 or point $y$ is less negative or at a higher positive potential than the point $x$ in the circuit. When the diode conducts, current flows from the smoothing capacitor 58, in the direction of the adjacent arrowed lines, back through the base or biasing resistor 34.

Gating voltages are thus provided across the resistor 34, as indicated by the pulse or slope lines 70 and 71 in FIGURE 3, and become more negative or change in a negative direction, thereby bringing the transistor 5 nearer to conduction in each instance so that subsequent synchronizing pulses, such as the respective pulses 72 and 73 added thereto, exceed the threshold of conduction and cause the transistor to fire or conduct, thus resulting in current flow from the capacitor 47 through the transistor as a switch, in the direction of the arrowed lines as indicated. The capacitor 47 then discharges rapidly through the transistor, as indicated by the discharge lines 63 in FIGURE 2, until the voltage at the point $x$ or terminal 46 reaches substantially zero, whereupon the cycle repeats. Thus the combination, or coincidence, of gating voltage pulse from the peak detector through the feedback circuit connection 32 and the synchronizing voltage pulse from the input terminals 7 through the input transformer 29, both applied to the input or base circuit 42, serves to trigger the blocking oscillator or signal generator into operation at a fixed frequency as a submultiple of the applied sync-signal frequency.

In the above consideration of the operation, it will be noted that the voltage at the terminal 46 or point $x$ on the circuit falls gradually more negative as the capacitor 47 charges until a point 75, for example, is reached, at which the voltage at the terminal $y$ has fallen in drifting slightly toward zero from the point 77 along the line 65. The voltage at the terminal $y$ is then positive with respect that at $x$, causing the diode to conduct. The voltage at $y$ then becomes more negative, or is restored, as indicated by the voltage lines 81 and 82 in FIGURE 2. The circuit at $x$ or the terminal 46 remains more negative than the circuit at $y$ or the terminal 53, and therefore the diode 6 conducts, causing a gating pulse 70 to be applied through the circuit 32 to the base circuit of the transistor 5. Then the next instant when a high-frequency synchronizing pulse arrives, the momentary negative biasing of the base is sufficient to cause the transistor to conduct as described.

The applied sync voltage pulses which follow and which are normally constant at the sync pulse frequency are indicated in FIGURE 3 below the terminal designation $z$ for the base circuit terminal 60. Following the triggering of the transistor, when the pulses 72—73 exceed the threshold of conduction, the signal voltage at the terminal $z$ or 60 passes through a peak 78 and then restores to normal until the next gating pulse, all as indicated in FIGURE 3.

In case that a different input or control voltage to be remembered is selected, such as a voltage —3.8 volts, for example, as would be the case for the level 79 indicated in FIGURE 2, the oscillator operation is the same as described except that the negative limit of —3.8 volts is reached more rapidly in the charging cycles 64 of the capacitor 47, whereupon the gate pulse and the coincidental pulse are applied, and the saw-tooth outline of the voltage wave at $x$ may be as indicated by the dotted lines 80 in FIGURE 2. Thus, for a different control or input voltage, a different frequency of operation of the oscillator results. The frequency of the oscillator changes so that the output voltage assumes the next stable level more negative than the control voltage. For a control voltage of —3.8 volts the output voltage may be —4.0 volts, in the present example.

The oscillator circuit provides an output voltage at the output terminals 11—12 corresponding to the frequency of oscillation as established by the conduction level of the peak detector or diode 6. This voltage is thus a function of the frequency-division ratio. This voltage, and the charging rate of the integrating capacitor 47 through the control or charging resistor 48, determines the period of oscillation approximately, in that a gating pulse (70—71) of moderate duration is applied at the input circuit 42 of the transistor thereby permitting the period to be determined accurately by the appearance of the next synchronizing pulse (72—73) in this interval, as indicated in FIGURE 3.

The memory action occurs because the high-frequency synchronizing pulses serve to quantize the frequency of blocking oscillations, so that slow drift is prevented. However, the necessity for the gating pulse to be present as well as the synchronizing pulse for firing the transistor, prevents frequency changes from one quantizing level to another. Thus an established frequency of oscillation is maintained and this, in turn, establishes a quantized output voltage which is the nearest quantum level of larger magnitude than the control or input voltage.

It will thus be seen that the memory may be controlled by the application of a control voltage, at the terminals 9—10 and across the common voltage input-output circuit, to establish a desired output voltage at the voltage output terminals 11—12. The latter may be connected through an output or utilization circuit 84 with utilization means, such as voltage responsive controlled apparatus indicated by the block 85. Likewise, the input or control voltage at the terminals 9—10 may be applied through a control or voltage-supply circuit 86 from any suitable control voltage source, as indicated by the block 87. This may be a signal rectifier, or the like, the output voltage of which, at different levels, is used to control or periodically set the apparatus 85 to corresponding different conditions of operation, upon operation of the switch means 20.

It will also be seen that the established frequency of oscillation, above referred to, which is maintained in response to an applied control voltage, and which establishes the quantized output voltage, may provide a frequency memory. For this purpose, the oscillator circuit may be provided with signal output means for deriving the oscillator signal at the established frequencies in response to the voltage control. In the present example this is provided in connection wtih the feedback transformer 26 by a tertiary or output winding 88 having connection with signal (frequency) output terminals 89. These may be connected with any sutiable utilization means (not shown), as in the case of the output voltage terminals 11—12, where a voltage-controlled signal at different discrete frequencies is desired.

The voltage-memory circuit or system of the present invention may be considered to comprise a number of circuit elements, the operational relation of which may be represented as shown in the block diagram of FIGURE 4 to which, with FIGURES 1, 2 and 3, attention is now directed. Comparing the diagram with the circuit, the transistor oscillator base or input circuit 42 may be considered to be a signal coincidence circuit, indicated by the block 91, to which the high-frequency sync-pulses 72—73 and the gate pulses 70—71 are applied as indicated by the signal circuit paths 90 and 92, respectively.

When there is a coincidence of a gate pulse and a high-frequency pulse the coincidence circuit 91 provides output trigger pulses which are applied, as indicated, to a discharge circuit 93 which includes the transistor 5 and the collector circuit 45 of FIGURE 1. The ramp generator 94 is the integrating circuit of FIGURE 1, which includes the integrating capacitor 47 and the charging resistor 48. The ramp output voltage, at the terminal 46 of FIGURE 1, is effectively applied along a circuit path indicated at 95 to a voltage comparator 96, for comparison with the system output voltage which is also applied to the comparator 96 through an output circuit path indicated at 97. The comparator, or comparator circuit, is substantially the diode 6, and its circuit. The differential or resultant voltage output from the comparator is conveyed by the circuit connection 92 as a gate pulse for the coincidence circuit.

The short-time voltage memory, represented by the block 98, may be considered to be the output or diode smoothing capacitor 58 and its load resistor 55 which receives a restoring or charging current from the ramp generator, as at the terminal 46 of FIGURE 1, when the diode is conducting. This recharging or restoring current operation of the capacitor is indicated by the circuit connection 99 in FIG. 3. The coincidence circuit, the discharge circuit and the ramp generator are all part of the variable frequency saw-tooth generator which is gated into conduction by coincidental high-frequency sync pulses, both being required to be present at the same time, whereby the output voltage and/or the frequency of operation remain substantially constant except during the control periods.

From the foregoing consideration it will be seen that a D.-C. input or control voltage such as −7.8 volts applied to the input terminals 9—10, in the polarities indicated, results in setting the frequency of oscillations to a predetermined value quantized to the synchronizing pulse frequency. This determines the output voltage which is quantized to the nearest level above the control voltage. Thus the control voltage in the present case may be −7.8 volts for the −8.0 volts output indicated.

The activating switch means 20, as hereinbefore indicated, may be manually, electrically, or electronically operated. In some instances it may be provided by a transistor or a relay in any suitable circuit configuration for operating as a controlled switch. Thus any suitable activating means may be used in the system for controlling the application of the input voltage or signal.

From the foregoing description it will be seen that a circuit in accordance with the invention may be of simplified construction and adapted readily to provide voltage and frequency memory within a relatively wide range of voltages and frequencies as determined by the circuit parameters and frequency division ratios desired. This type of oscillator is unusual in that it has no normal or single frequency of oscillation, and will assume any frequency that the D.-C. control voltage indicates. However, when a frequency is established the circuit continues to oscillate at this frequency in a relatively highly stabilized condition, by reason of the fact that a gating pulse as well as a synchronizing pulse must be present to change the frequency from one quantized level to another. Thus an established frequency of oscillation is maintained at all times and the circuit has correspondingly voltage and frequency memory with a high degree of stability.

Having described the invention, what is claimed is:

1. An electrical memory system for providing voltage and frequency memory, comprising in combination, a monostable blocking oscillator including a transistor element having a base to collector feedback circuit and having a common grounded emitter circuit, means for applying synchronizing signal pulses to said oscillator for operation at sub-harmonic frequencies thereof, a base resistor connected serially in said base circuit, an input-output circuit for applied control and output voltages, means including an integrating circuit coupled to the collector circuit and a diode peak detector coupled between said integrating circuit and said input-output circuit for deriving gating signal pulses for said oscillator across said base resistor and a quantized output voltage at said input-output circuit, and said output voltage and the resulting output frequency being constant in the absence of control voltage level change, whereby the system has both voltage and frequency memory.

2. An electrical memory system for providing voltage and frequency memory, comprising in combination, a monostable blocking oscillator adjustable to different frequency levels in response to control signal at different voltage levels, means for applying synchronizing signal pulses of constant frequency to said oscillator to adjust the frequency level thereof to one of a plurality of sub-harmonic frequencies of the synchronizing signal for frequency-division operation, and means including an integrating circuit and a peak diode detector coupled to said oscillator for deriving a controlled output voltage quantized to a nearest quantum level of larger magnitude than an applied control voltage, the frequency of oscillation being thereby determined by the amplitude of the applied control voltage and the quantized output voltage, and the resulting output frequency being constant in the absence of a control voltage, whereby the system has both voltage and frequency memory.

3. A voltage-controlled electrical memory system comprising in combination, a common signal input-output circuit having control voltage input terminals and output voltage terminals, means including a single transistor element providing a self-triggering monostable blocking oscillator, means for applying high-frequency synchronizing signal pulses to said oscillator at a fixed frequency for frequency division operation thereof, a peak diode detector circuit coupled between said oscillator and said input-output circuit, means including a feedback connection from said peak detector circuit to said oscillator for applying gating voltage pulses from said detector circuit to said oscillator in coincidence with the high frequency synchronizing pulses for triggering the blocking oscillator into operation at a fixed frequency as a submultiple of the synchronizing signal frequency, and means for applying a control voltage to the input terminals for establishing the conduction level of the peak detector, thereby to establish the frequency of oscillation and quantized output voltage at said output terminals.

4. A voltage-controlled electrical memory system as defined in claim 3, wherein switch means are provided for applying a control voltage to said input-output circuit from said input terminals and wherein the period of oscillation is controlled by an integrating circuit connected with the oscillator preceding the peak detector and including an integrating capacitor with means for charging said capacitor at a predetermined rate including a charging resistor and an operating voltage source, said system thereby operating through the coincidence of a gate pulse and a synchronizing pulse at the oscillator circuit, whereby the oscillator frequency is quantized to the synchronizing pulse frequency and determines the output voltage quantized to the nearest level above the control voltage.

5. A voltage-controlled electrical memory system comprising in combination, means providing a common signal input-output circuit having control voltage input terminals and output voltage terminals, a saw-tooth signal generator including a self-triggering monostable blocking oscillator and an integrating circuit controlled thereby, means for applying high-frequency synchronizing pulses to said oscillator at a fixed frequency for frequency division operation of said oscillator, a peak detector circuit coupled between said integrating circuit and said input-output circuit as voltage comparator means, means providing a feedback connection from said peak detector circuit to said oscillator for applying periodic gating voltage pulses to said oscillator in coincidence with the high-frequency synchronizing pulses for triggering the blocking oscillator into operation at a fixed frequency submultiple of the synchronizing signal frequency, and means for applying a direct-current control voltage to the input terminals for establishing the voltage comparison and conduction level of the peak detector, thereby to establish the frequency level of oscillation and corresponding quantized output voltage level at said output terminals.

6. A voltage controlled electrical memory system comprising in combination, a monostable blocking oscillator including single transistor element having a collector circuit and a base circuit coupled for the generation of oscillations and having an emitter connected to common ground means for the system, an integrating capacitor connected between the collector circuit and said common ground means, means for applying a controlled charging current to said integrating capacitor, means for applying high-frequency synchronizing pulses to said base circuit, means providing a gate-pulse circuit connection for said base circuit including a base resistor connected serially therein to said common ground means, means for applying a reverse biasing potential of predetermined amplitude to said base resistor, means providing a common input-output circuit conductor, a diode peak detector connected between said collector circuit and said input-output circuit conductor and having an output circuit including a smoothing capacitor connected between said input-output circuit conductor and the base end of said base resistor, and means including a switch element for applying a control voltage between said input-output circuit conductor and common ground for said system.

7. A voltage-controlled electrical memory system comprising in combination, a transistor oscillator having a collector circuit and a base circuit coupled for the generation of oscillations and having an emitter connected to common ground means for the system, an integrating capacitor connected between the collector circuit and said common ground means, means including a series control resistor and a direct-current source for applying a charging current to said integrating capacitor to cause said collector circuit voltage to increase negatively with respect to common ground means, means for applying high-frequency synchronizing signal pulses to said base circuit, a base resistor in said base circuit connected to said common ground means, means including said base resistor for applying to said transistor element a reverse biasing potential of predetermined amplitude, a common voltage input-output circuit conductor for said system, a diode detector connected between said collector circuit and said input-output conductor and poled to conduct in response to an increase in said collector circuit voltage above a predetermined threshold value, a smoothing capacitor for said diode detector connected between the input-output circuit conductor and the base end of said base resistor for discharging through said base resistor upon diode conduction, and means for applying a control voltage between said input-output circuit conductor and common ground for said system, to set the frequency level of said oscillator and output voltage level of said system.

8. An electrical voltage-controlled memory system comprising in combination, means providing a common input-output circuit having a pair of voltage output terminals and a pair of control voltage input terminals, switch means for controlling the application of a voltage at the input terminals to the common input-output circuit, a transistor oscillator having a collector circuit and a base circuit coupled for generating oscillations and having a common grounded emitter circuit connected with one side of said input-output circuit, an integrating circuit including a capacitor connected between said collector and emitter circuits and means for charging said capacitor including a voltage source and a series controlling resistor, a diode detector connected between the collector circuit and the other side of said common input-output circuit, means for applying high-frequency synchronizing pulses to said oscillator through said base circuit, a base resistor providing a connection for said base circuit with said common grounded emitter circuit, means for applying a reverse biasing potential to said transistor across said base resistor, and output smoothing capacitor for said detector connected serially between said other side of the input-output circuit and the base end of said base resistor for discharging through the base resistor upon conduction of the diode detector thereby to trigger the oscillator into operation at a submultiple of the pulse signal frequency, and establish a quantized output voltage corresponding to the input voltage and the frequency of oscillation.

9. A voltage-operated electrical memory system comprising in combination, means providing control and output voltage circuits including two circuit conductors one of which is above ground potential for the system, a transistor oscillator having regeneratively-coupled base and collector circuits and a common emitter circuit connected with the other of said conductors, a base resistor connected between the base and emitter circuits, means for applying high-frequency synchronizing pulses to said base circuit, a peak-detector including a diode connected conductively between the collector circuit and said one conductor, a signal integrating capacitor connected between said collector and emitter circuits thereby to have a discharge path through said transistor upon conduction responsive to coincidental gating voltage and synchronizing pulses, means for charging said capacitor to effect diode conduction periodically, means for applying an input control voltage between the conductors of said first-named circuit means, a diode output smoothing capacitor for said detector diode connected serially with said base resistor between said conductors for periodic discharge through diode conduction, means for applying a reverse bias for said transistor across said base resistor, means for deriving said gating voltage pulses for said oscillator across said base resistor by said diode conduction in response to varitaions in voltage at the oscillator collector circuit with respect to an applied input voltage, whereby the oscilltaor circuit provides output voltage corresponding to the frequency of oscillation as established by the conduction level of the peak detector.

10. A voltage- operated electrical memory system comprising in combination, a single element transistor oscillator having base and collector circuits coupled for oscillation feedback and an emitter circuit providing a common circuit return connection for said system, input signal coupling means for applying high-frequency synchronizing pulses to the oscillator and a base resistor connected serially in said base circuit, a diode peak-detector circuit connected to said collector and emitter circuits, a signal integrating capacitor in said last named connection, means for deriving a triggering voltage pulse for said oscillator at said base resistor through said detector circuit in response to diode conduction therein, means for applying a reverse bias for said transistor across said base resistor to cut off operation in the absence of coincidental triggering and synchronizing pulses, and means for applying an input control voltage to said detector circuit for establishing the conduction level thereof and the output voltage and frequency of oscillation of the system corresponding to the conduction level of the peak detector.

11. A memory system comprising a monostable blocking oscillator including a charging circuit, means for applying synchronizing pulses to said blocking oscillator, said synchronizing pulses being of insufficient amplitude to trigger said blocking oscillator, an output circuit including charging storage means, means for developing a gating pulse when the voltage developed in said charging circuit bears a predetermined relationship to the voltage across said charge storage means and for restoring substantially the initial charge to said charge storage means, means for applying said gating pulse being of insufficient amplitude to trigger said blocking oscillator, but of sufficient amplitude when combined with one of said synchronizing pulses to trigger said blocking oscillator.

12. A memory system as defined in claim 11 including means for changing the charge on said charge storage means.

13. A memory system as defined in claim 12 wherein said means for changing the charge on said charge storage means comprises means for applying an auxiliary gating pulse to said blocking oscillator.

14. A memory system comprising a charging circuit including a first capacitor, voltage responsive switch means for discharging said capacitor, an output circuit including a second capacitor for maintaining a predetermined voltage, a diode connected between said first and second capacitors to be reverse biased until the voltage across said first capacitor approximates said predetermined voltage whereupon said diode becomes forward biased and conducts, an impedance element connected in the conductive path of said diode for developing a switching voltage in response to conduction of said diode, means for applying synchronizing signals from a source of synchronizing signals and said switching voltage to said switch to cause said switch to discharge said first capacitor.

References Cited in the file of this patent

UNITED STATES PATENTS

| | | |
|---|---|---|
| 2,817,061 | Bowers | Dec. 17, 1957 |
| 3,022,469 | Bahrs et al. | Feb. 20, 1962 |